(12) United States Patent
Grenier et al.

(10) Patent No.: US 7,971,220 B2
(45) Date of Patent: Jun. 28, 2011

(54) SYSTEM, METHOD, COMPUTER PROGRAM PRODUCT, AND APPARATUS FOR AUTOMATICALLY ENSURING CONSISTENCY BETWEEN PROGRAM AND SYSTEM INFORMATION PROTOCOL TABLES AND PROGRAM SPECIFIC INFORMATION TABLES IN A DIGITAL TELEVISION STREAM

(75) Inventors: Frederic Bernard Grenier, Southwick, MA (US); Jean Macher, Southwick, MA (US)

(73) Assignee: Thomson Licensing, Boulogne-Bellancourt (FR)

( * ) Notice: Subject to any disclaimer, the term of this patent is extended or adjusted under 35 U.S.C. 154(b) by 1505 days.

(21) Appl. No.: 10/424,749

(22) Filed: Apr. 29, 2003

(65) Prior Publication Data
US 2004/0019910 A1 Jan. 29, 2004

Related U.S. Application Data

(60) Provisional application No. 60/376,186, filed on Apr. 30, 2002.

(51) Int. Cl.
*H04N 7/20* (2006.01)
(52) U.S. Cl. ........... 725/70; 725/134; 725/142; 725/146
(58) Field of Classification Search .................... 725/70, 725/146, 134, 142
See application file for complete search history.

(56) References Cited

U.S. PATENT DOCUMENTS

| 5,654,748 A * | 8/1997 | Matthews, III | 725/14 |
| 6,064,676 A * | 5/2000 | Slattery et al. | 370/412 |
| 7,032,236 B1 * | 4/2006 | Ozkan et al. | 725/39 |
| 7,263,666 B2 * | 8/2007 | Corl et al. | 715/778 |
| 2003/0081686 A1 * | 5/2003 | Jung et al. | 375/240.25 |
| 2003/0088686 A1 * | 5/2003 | Jennings | 709/231 |
| 2003/0197732 A1 * | 10/2003 | Gupta | 345/764 |
| 2004/0194149 A1 * | 9/2004 | Kessler | 725/134 |
| 2006/0140592 A1 * | 6/2006 | Kang | 386/111 |

OTHER PUBLICATIONS

Frederic Grenier, Appendix to U.S. Appl. No. 60/376,186, May 1, 2001 "Real-World PSIP Solutions".*

* cited by examiner

*Primary Examiner* — Joseph P Hirl
*Assistant Examiner* — Jivka Rabovianski
(74) *Attorney, Agent, or Firm* — Robert D. Shedd; Robert B. Levy

(57) ABSTRACT

A system, method, computer program product, and apparatus for automatically ensuring consistency between program and system information protocol (PSIP) tables and program specific information (PSI) tables in a digital television (DTV) stream, for example, in ATSC DTV stream. Encoders generate MPEG streams including PSI tables. A PSIP generator generates PSIP information from program information. A remultiplexer combines the MPEG information and the PSIP information while resolving any conflicts between the PSI tables and the PSIP tables based on a set of rules. The transport stream output by the remultiplexer includes consistent information in both the PSI tables and the PSIP tables.

24 Claims, 4 Drawing Sheets

SYSTEM, METHOD, COMPUTER PROGRAM PRODUCT, AND APPARATUS FOR AUTOMATICALLY ENSURING CONSISTENCY BETWEEN PROGRAM AND SYSTEM INFORMATION PROTOCOL TABLES AND PROGRAM SPECIFIC INFORMATION TABLES IN A DIGITAL TELEVISION STREAM

CROSS-REFERENCE TO RELATED PATENT DOCUMENTS

The present document contains subject matter related to that disclosed in commonly owned, co-pending provisional application Ser. No. 60/376,186 filed Apr. 30, 2002, entitled SYSTEM, METHOD, COMPUTER PROGRAM PRODUCT, AND APPARATUS FOR AUTOMATICALLY ENSURING CONSISTENCY BETWEEN PROGRAM AND SYSTEM INFORMATION PROTOCOL TABLES AND PROGRAM SPECIFIC INFORMATION TABLES IN A DIGITAL TELEVISION STREAM, the entire contents of which, including Appendices A-D, are incorporated herein by reference.

BACKGROUND OF THE INVENTION

1. Field of the Invention

The present invention relates to a system, method, computer program product, and apparatus for automatically ensuring the consistency of Program and System Information Protocol (PSIP) tables and Program Specific Information (PSI) tables in a digital television stream.

2. Discussion of the Background

As digital television (DTV) evolves and becomes more popular, techniques for exploiting this new technology will evolve as well. The transport layer of an Advanced Television Systems Committee (ATSC) DTV signal is based on the Moving Pictures Expert Group (MPEG-2) standard. An ATSC DTV-compliant stream includes the MPEG-2 information, but also provides additional information.

MPEG-2 defines, among other things, a basic set of tables called Program Specific Information (PSI) tables that include tuning information that allows a receiver to "tune to" (or identify) the individual components of a program (e.g., video, audio, and data) within the digital television stream.

The ATSC standard A/65, the entire contents of which being incorporated herein by reference, specifies the addition of tables to meet various specific requirements that, for example, support United States DTV standards. These tables are Program and Specific Information Protocol (PSIP) tables and provide, for example, tuning information, branding information, and program guide information. The tuning information provided in the PSIP tables is largely duplicative of the information contained in the MPEG PSI tables, however, some additional features are added as well. The branding information provided in the PSIP tables provides a two-part channel number that links each digital channel to the analog channel (or main channel) of the station (e.g., channel 4). The program guide information provided in the PSIP tables provides electronic program guide (EPG) information.

Due to the redundancy of the tuning information in the PSI tables and the PSIP tables, manufacturers of DTV-compliant devices have been faced with a decision as to whether to access tuning information from the PSI tables or the PSIP tables, since both are transmitted in the ATSC stream. Some receivers are configured to use the tuning information from the PSI tables, and others are configured to use the tuning information from the PSIP tables.

SUMMARY OF THE INVENTION

The present inventors have recognized that currently no systems, methods, computer program products, or apparatuses are available to automatically ensure consistency between the information in the PSI tables and the information in the PSIP tables within an ATSC DTV stream.

The present inventors also recognized that if there is an inconsistency in the tuning information between the PSI and PSIP tables, receivers that are configured to use the tuning information from only one of the PSI tables or PSIP tables, will not always accurately identify all signal components of a DTV program due to errors and/or omissions in the tuning information. Thus, another object of the invention is to ensure that ATSC DTV compatible receivers are able to present an accurate and full range of signal components available in the ATSC DTV stream for selection by the end-user.

Accordingly, one object of the present invention is to provide a solution to this problem, as well as other problems and deficiencies associated with consistency between the components of an ATSC stream.

The above-described and other objects are addressed by the present invention, which includes a novel computer-based system, method, computer program product, and apparatus for resolving inconsistencies between information in PSI tables and information in PSIP tables within an ATSC DTV stream. A feature of the invention is to apply rules to resolve inconsistencies and provide consistent information in both the PSI tables and the PSIP tables. By providing an ATSC DTV stream that includes consistent information in both the MPEG portion and the ATSC portion, devices acquiring information from either portion of the ATSC stream will have access to the same information.

As an alternative to reconciling the tuning information in PSI and PSIP tables prior to transmitting the ATSC DTV stream, a receiver according to the present invention is equipped to check for inconsistencies between the PSIP and PSI tables, and to ensure that information in the PSIP table and the PSI table are consistent. When the information is not consistent, the receiver employs a set of rules to derive a set of tuning information from the PSI tables and PSIP tables for use by the receiver.

Consistent with the title of this section, the above summary is not intended to be an exhaustive discussion of all the features or embodiments of the present invention. A more complete, although not necessarily exhaustive, description of the features and embodiments of the invention is found in the section entitled "DETAILED DESCRIPTION OF THE PREFERRED EMBODIMENTS."

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
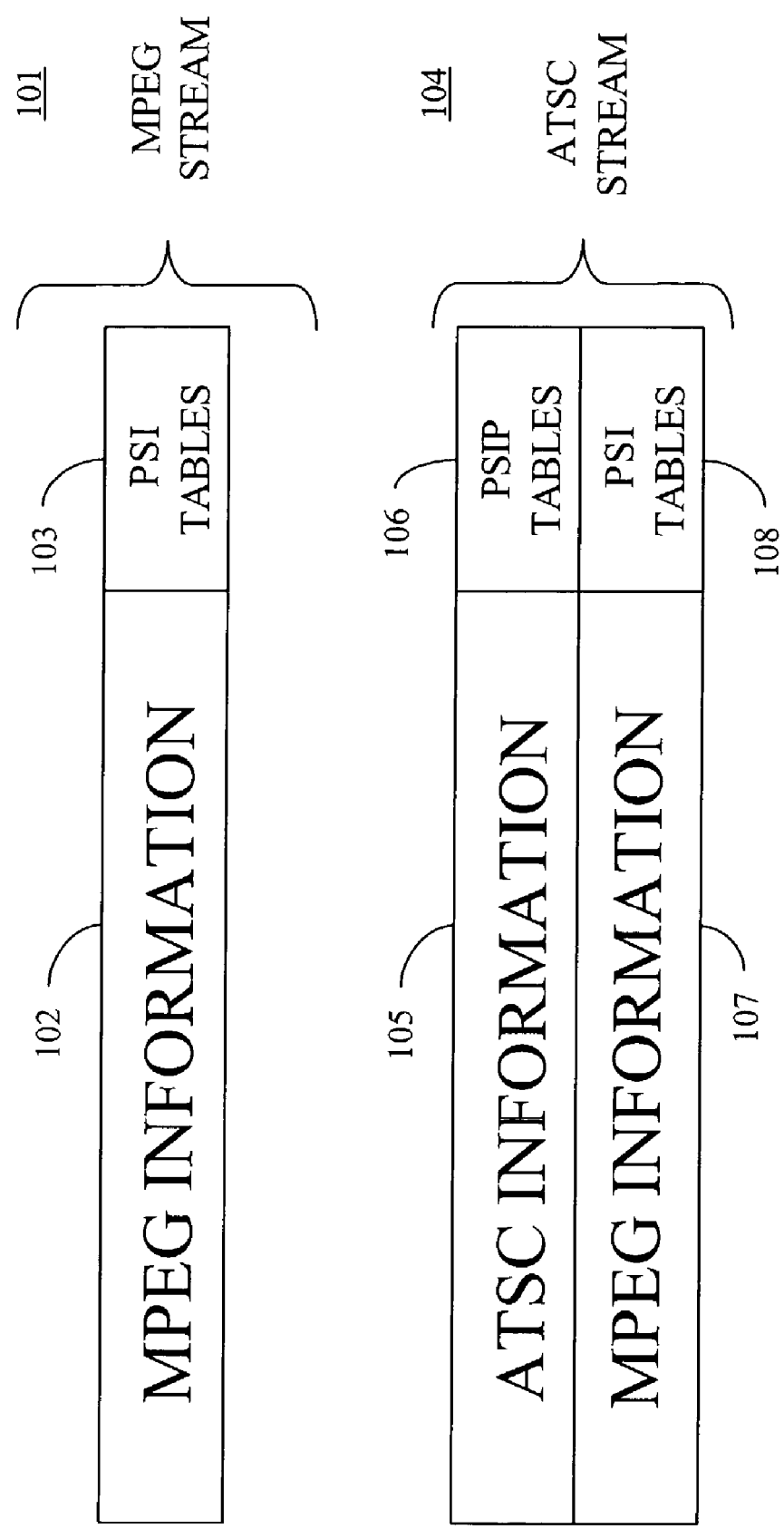
FIG. 1 is a block diagram illustrating (a) PSI tables in an MPEG stream and (b) PSI tables in an MPEG portion and PSIP tables in an ATSC portion of an ATSC DTV stream.

Referring now to the drawings, FIG. 1 is a block diagram illustrating (1) PSI tables 103 in an MPEG stream 101, and (2) PSI tables 108 in an MPEG portion and PSIP tables 106 in an ATSC portion of an ATSC DTV stream 104. As shown in FIG. 1, an MPEG stream 101 includes PSI tables 103 and other MPEG information 102. The MPEG-2 system standard defines, for example, the following tables: (1) the Program Association Table (PAT) which lists the currently-available programs and contains the Transport Stream ID (TSID); the Program Map Table (PMT) which lists for each program the currently available video, audio, and data components, as well as other optional descriptors; and (3) the Conditional Access Table (CAT) which lists the conditional access systems in use in a stream and points to the subscribers rights information. The Advanced Television Systems Committee (ATSC) digital television (DTV) standard (ATSC DTV Standard: "Digital Television Standard, Revision B, with Amendment 1," Doc. A/53B, Advanced Television Systems Committee, Aug. 7, 2001), ATSC program and system information protocol (PSIP) standard (ATSC PSIP: "Program and System Information Protocol for Terrestrial Broadcast and Cable (Revision B), Doc. A/65B, Advanced Television Systems Committee, Mar. 18, 2003), and Moving Pictures Expert Group (MPEG-2 Systems: ISO/IEC 13818-1, International Standard, Information Technology—Generic coding of moving pictures and associated audio information: Systems, second edition, Dec. 1, 2000) standard are well known by those of ordinary skill in the art, the entirety of all three of which are incorporated herein by reference.

An ATSC stream 104, on the other hand, includes both MPEG information, such as that described above, and an ATSC portion, including PSIP tables 106 and other ATSC information 105. The MPEG portion of the ATSC stream 104 includes the PSI tables 108, and other MPEG information 107, as discussed above. The PSIP tables 106 of the ATSC stream 104 include tuning information, branding information, and program guide information.

The tuning information provided in the PSIP tables 106, while mostly duplicative of the tuning information provided in the PSI tables 108, adds some further information such as, for example, the carrier frequency of the channel and information indicating whether the channels are active. The tuning information in the PSIP tables 106 also includes information supporting a Directed Channel Change capability which allows a broadcaster to direct enabled receivers to automatically tune to a specific channel if certain conditions are met.

The branding information provided in the PSIP tables 106 provides a two-part channel number that links each digital channel to the analog channel of the station. It also provides a short channel name, a long channel name and a channel description.

The program guide information contained in the PSIP tables 106 is an electronic program guide (EPG) that enables a viewer to know what program is currently running, as well as what will be aired in the next several days. For each program, the viewer can access its title, start time, duration, description, ratings, which audio tracks are provided, and whether closed captioning is provided.

Figure 2:
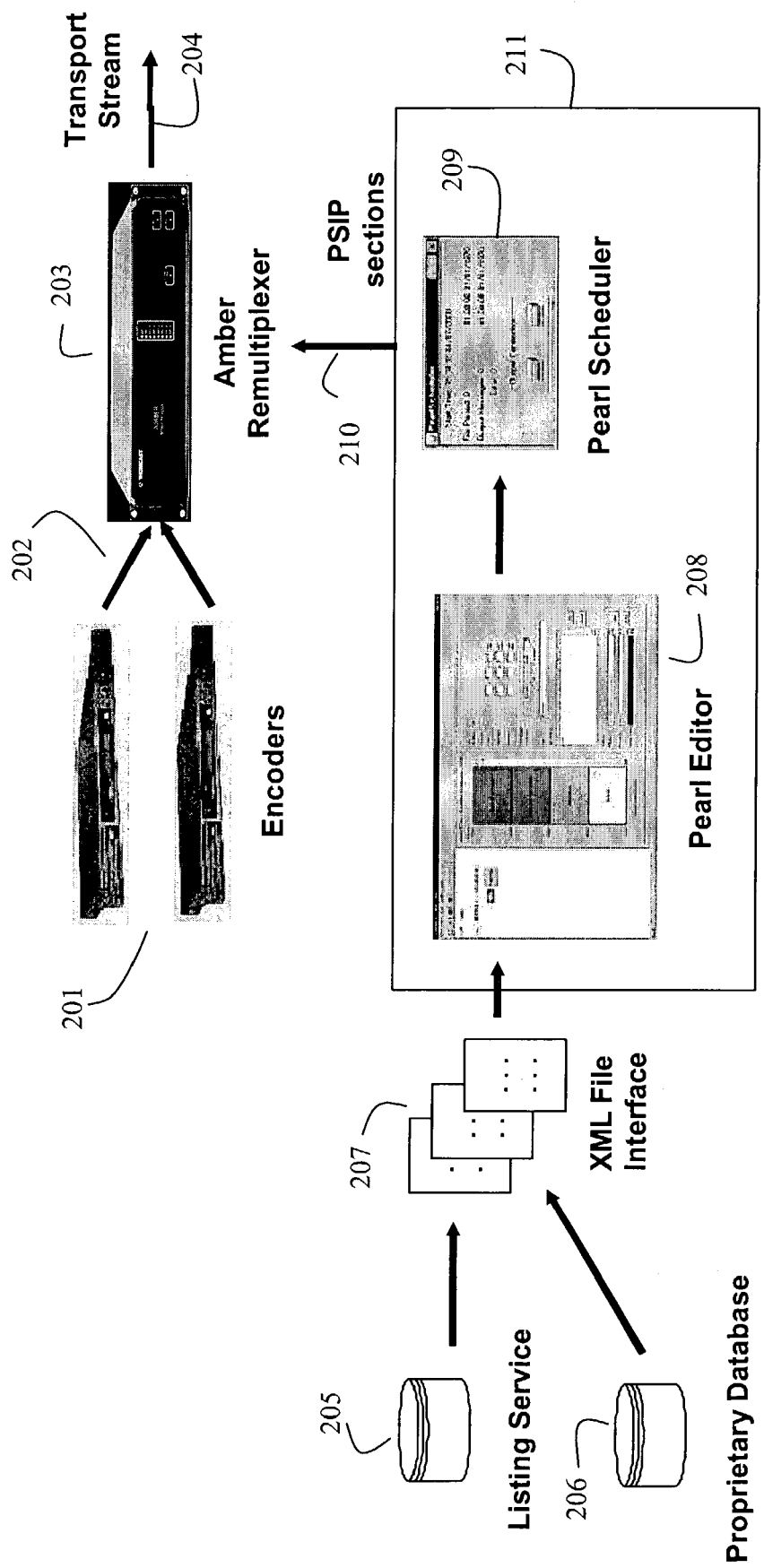
FIG. 2 is a block diagram of a system configuration for producing a DTV stream including both PSI tables and PSIP tables according to one embodiment of the present invention.

FIG. 2 is a block diagram of a system configuration for producing a DTV stream, or transport stream 204, that includes both PSI tables and PSIP tables according to one embodiment of the present invention. As shown in FIG. 2, the system includes various encoders 201 which are used to generate MPEG streams 202 containing an encoded program. As discussed above, the MPEG stream 202 will include PSI tables that provide tuning information identifying the various components of the MPEG stream 202. The encoders 201 are used by, for example, a broadcast facility, a cable head end, or another ATSC standard compliant user to generate MPEG streams 202 containing content to be broadcast.

The system also includes a PSIP generator 211 which receives program information 207 and generates PSIP information 210. In one embodiment of the present invention, the program information 207 is provided to the PSIP generator 211 through a file interface, for example, a file interface based on the eXtensible Markup Language (XML). XML is a well known markup language, and is described in further detail in Marchal, B., "XML By Example," Que, 2000, ISBN 0-7897-2242-9, the entire contents of which is incorporated herein by reference. However, in other embodiments of the present invention, other interfaces are used for providing the program information 207 to the PSIP generator 211. Other interfaces for providing program information 207 include, but are not limited to, a flat file interface, another markup language interface (e.g., HTML, DHTML, HDML, etc.), and a database interface (e.g., an interface to a relational database management system or an object oriented database system). Markup languages are well known in the art, and are described in further detail in Chapter 24 of Gralla, P., "How the Internet Works," Que, Millenium Edition, 1999, ISBN 0-7897-2132-5, the entire contents of which is incorporated herein by reference.

The program information 207 includes information from, for example, a listing service database 205 such as the type provided by a listing service provider like Tribune Media Services. The present invention is in no way limited to using a listing service as the source of the program information, as other sources for the program information could be used as well. The program information 207 may also include information retrieved from a proprietary database 206, which may provide, for example, traffic information gathered by a particular station.

In one embodiment of the present invention, the PSIP generator 211 includes a PSIP editor 208, and a PSIP scheduler 209. The PSIP editor 208 is a software tool that provides an editor through which a user may manipulate the PSIP information provided in the program information 207. The PSIP scheduler 209 is another software tool that determines which PSIP information 210 should be provided for broadcast at which time.

The MPEG streams 202 and the PSIP information 210 are combined by a remultiplexer 203 such as the Amber TNM-40xx Digital TV Remultiplexer and Processor available from Thales Broadcast & Multimedia, Inc., where the Amber TNM-40xx Digital TV Remultiplexer and Processor is configured to implement the present invention. The remultiplexer 203 acquires information from the PSI tables of the MPEG streams 202 and the PSIP information 210 provided by the PSIP generator 211 and automatically reconciles the information in those tables to produce an ATSC transport stream 204 that includes consistent information in both the PSI tables of the MPEG portion of the ATSC DTV stream 204 and the PSIP tables of the ATSC portion of the ATSC DTV stream 204.

In reconciling the information from the PSI tables with the information from the PSIP tables, the remultiplexer 203 implements a set of rules established to resolve inconsistencies. In one embodiment of the present invention, the rules implemented by the remultiplexer are hardcoded into the remultiplexer. In another embodiment of the present invention, the rules are configurable by a user, for example, through a rules editor software tool.

The remultiplexer 203 reads both sets of tables and, for each redundant piece of information, checks whether it is consistent, and if not, modifies one of them according to precedence rules. These rules can either be hard-coded into the remultiplexer 203, programmable, or user-configurable. The redundant information includes, but is not limited to:

Transport Stream ID
PCR PIDs
Elementary stream PIDs
Elementary stream language information
Content Advisory ratings
Close Captioning information
Virtual Channel activity status By producing an ATSC DTV stream 204 that includes consistent information in both the PSI tables and the PSIP tables, vendors of, for example, DTV receivers, can design products that access information from either source, thereby providing design flexibility. Moreover, legacy receivers that access, for example, tuning information from the PSIP tables that heretofore was unreliable, can now access reliable information that is consistent with the information in the PSI tables without a need to upgrade the receiver.

While the system of FIG. 2 describes one architecture for implementing the present invention, as would be understood by one of ordinary skill in the art, various other architectures may be employed for taking advantage of the present invention. For example, in another embodiment of the present invention, various PSIP editors 208 may all have access to a common database from which the PSIP scheduler 209 obtains the PSIP information 210 for sending to the remultiplexer 203. In this embodiment, the database is configured to resolve inconsistencies in the entries as they are manipulated by the various PSIP editors 208.

In yet another embodiment of the present invention, the PSIP generator 211 is implemented as a component of the remultiplexer 203. In this embodiment, the remultiplexer 203 receives program information 207 directly, and generates the PSIP information 210 and PSIP scheduling information internally.

In still another embodiment, the onus is on the receiver to reconcile differences in the tuning information contained in the PSI tables and PSIP tables. Generally, the tuning information in the PSI tables is used by the receiver when a difference is detected. However, another feature of the invention is to allow the receiver to select the tuning information from the PSIP tables, or a combination of the tuning information from the PSIP tables and PSI tables. Alternatively, the receiver presents to an end-user an aggregate set of program features for manual selection by an end-user.

While the majority of the overlap between the PSI tables and the PSIP tables is in the tuning information contained therein, the present invention is equally applicable in resolving other inconsistencies between the various components of an ATSC stream, or merely providing a mechanism for manipulating one portion of an ATSC stream based on information received by the remultiplexer 203 that can be used in creating an ATSC transport stream 204.

Figure 3:
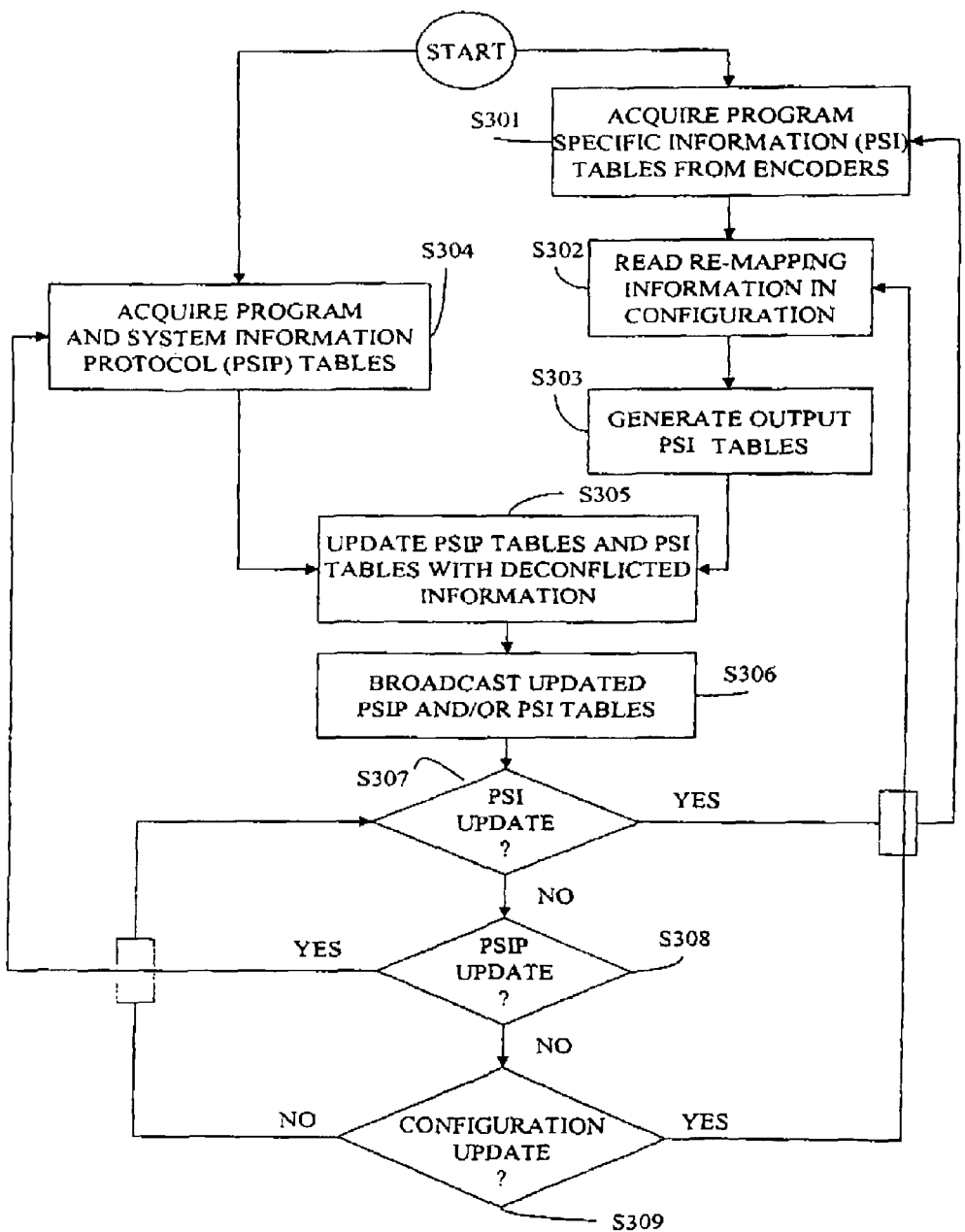
FIG. 3 is a flow diagram showing an exemplary process for ensuring consistency between PSIP tables and PSI tables in a DTV stream according to one embodiment of the present invention.

FIG. 3 is a flow diagram showing an exemplary process for ensuring consistency between PSIP tables and PSI tables in a digital television stream according to one embodiment of the present invention. As shown in FIG. 3, the process begins with step S301 where program specific information (PSI) tables are acquired from encoders 201. As discussed above, in one embodiment of the present invention, this information is acquired from the PSI tables of an MPEG-2 stream 202 produced by an encoder 201. The process then proceeds to step S302 where re-mapping information is read from configuration information. The process then proceeds to step S303 where, based on the information from the PSI tables acquired from the encoders 201, and the re-mapping information, output PSI tables are generated. In parallel with steps S301-S303 described above, step S304 is performed. In step S304, program and system information protocol (PSIP) information 210 is acquired from the PSIP generator 211.

Once the output PSI tables are generated and the PSIP tables are acquired, the process proceeds to step S305 where the PSIP tables and the output PSI tables are updated. In updating the PSIP tables and the PSI tables, the information from the output PSI tables and the information acquired from the PSIP tables is deconflicted according to a set of rules. One exemplary set of deconflicting rules includes (1) checking for inconsistencies in tuning information, and (2) replacing tuning information in the PSIP table with corresponding, but conflicting information from the PSI table. Alternatively, another set of rules is to replace the entire set of PSIP tuning information with that from the PSI tables, regardless if there are inconsistencies or not. As a further alternative, some or all of the PSI tuning information is replaced with that from the PSIP tables. The deconflicted information, for example, the deconflicted tuning information, is updated consistently in both the PSIP tables and the PSI tables that will both be included in an ATSC DTV stream 204. Once the consistent information has been updated, the process proceeds to step S306 where the updated PSIP and/or PSI tables are broadcast as part of the transport stream 204, for example, in ATSC DTV stream.

Once the updated PSIP and/or PSI tables have been broadcast, the process proceeds to step S307 where it is determined whether a PSI update is needed. If it is determined that a PSI update is needed (i.e., "Yes" at step S307), the process returns to step S301 where the new PSI table information is acquired from the encoders 201. If, on the other hand, a PSI update is not needed (i.e., "No" at step S307), the process proceeds to step S308 where it is determined whether a PSIP update is required.

If it is determined that a PSIP update is required (i.e., "Yes" at step S308), the process returns to step S304 where the updated PSIP tables are acquired from the PSIP generator 211. If, on the other hand, it is determined that a PSIP update is not required (i.e., "No" at step S308), the process proceeds to step S309 where it is determined whether a configuration update is necessary.

If it is determined that a configuration update is necessary (i.e., "Yes" at step S309), the process returns to step S302 where the re-mapping information is read from the configuration information. If, on the other hand, it is determined that a configuration update is not required (i.e., "No" at step S309), the process goes back to checking whether a PSI update is necessary (S307). Alternatively, the process ends after a predetermined number of checking/updating operations, predetermined time period, or reception of an external "disable" signal.

Figure 4:
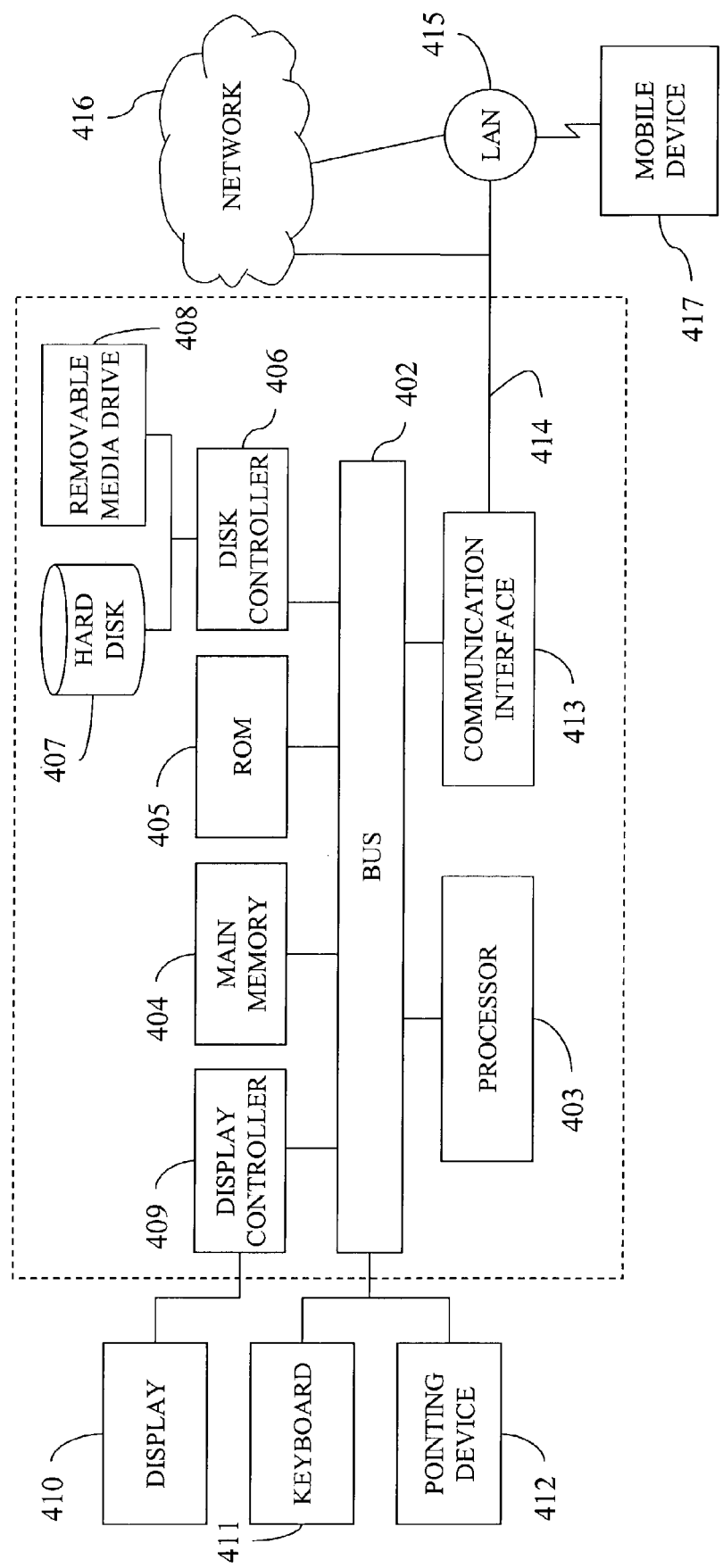
FIG. 4 is an exemplary computer system programmed to perform one or more of the special purpose functions of the present invention.

FIG. 4 illustrates a computer system 401 upon which an embodiment of the present invention may be implemented. The present invention may be implemented on a single such computer system, or a collection of multiple such computer systems. The computer system 401 includes a bus 402 or other communication mechanism for communicating information, and a processor 403 coupled with the bus 402 for processing the information. The computer system 401 also includes a main memory 404, such as a random access memory (RAM) or other dynamic storage device (e.g., dynamic RAM (DRAM), static RAM (SRAM), and synchronous DRAM (SDRAM)), coupled to the bus 402 for storing information and instructions to be executed by processor 403. In addition, the main memory 404 may be used for storing temporary variables or other intermediate information during the execution of instructions by the processor 403. The computer system 401 further includes a read only memory (ROM) 405 or other static storage device (e.g., programmable ROM (PROM), erasable PROM (EPROM), and electrically erasable PROM (EEPROM)) coupled to the bus 402 for storing static information and instructions for the processor 403.

The computer system 401 also includes a disk controller 406 coupled to the bus 402 to control one or more storage devices for storing information and instructions, such as a magnetic hard disk 407, and a removable media drive 408 (e.g., floppy disk drive, read-only compact disc drive, read/write compact disc drive, compact disc jukebox, tape drive, and removable magneto-optical drive). The storage devices may be added to the computer system 401 using an appropriate device interface (e.g., small computer system interface (SCSI), integrated device electronics (IDE), enhanced-IDE (E-IDE), direct memory access (DMA), or ultra-DMA).

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 401 may also include a display controller 409 coupled to the bus 402 to control a display 410, such as a cathode ray tube (CRT), for displaying information to a computer user. The computer system includes input devices, such as a keyboard 411 and a pointing device 412, for interacting with a computer user and providing information to the processor 403. The pointing device 412, for example, may be a mouse, a trackball, or a pointing stick for communicating direction information and command selections to the processor 403 and for controlling cursor movement on the display 410. In addition, a printer may provide printed listings of the data stored and/or generated by the computer system 401.

The computer system 401 performs a portion or all of the processing steps of the invention in response to the processor 403 executing one or more sequences of one or more instructions contained in a memory, such as the main memory 404. Such instructions may be read into the main memory 404 from another computer readable medium, such as a hard disk 407 or a removable media drive 408. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 401, for driving a device or devices for implementing the invention, and for enabling the computer system 401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 403 for execution. A computer readable medium may take many forms, including but not limited to, non-volatile media, volatile media, and transmission media. Non-volatile media includes, for example, optical, magnetic disks, and magneto-optical disks, such as the hard disk 407 or the removable media drive 408. Volatile media includes dynamic memory, such as the main memory 404. Transmission media includes coaxial cables, copper wire and fiber optics, including the wires that make up the bus 402. Transmission media also may also take the form of acoustic or light waves, such as those generated during radio wave and infrared data communications.

Various forms of computer readable media may be involved in carrying out one or more sequences of one or more instructions to processor 403 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 401 may receive the data on the telephone line and use an infrared transmitter to convert the data to an infrared signal. An infrared detector coupled to the bus 402 can receive the data carried in the infrared signal and place the data on the bus 402. The bus 402 carries the data to the main memory 404, from which the processor 403 retrieves and executes the instructions. The instructions received by the main memory 404 may optionally be stored on storage device 407 or 408 either before or after execution by processor 403.

The computer system 401 also includes a communication interface 413 coupled to the bus 402. The communication interface 413 provides a two-way data communication coupling to a network link 414 that is connected to, for example, a local area network (LAN) 415, or to another communications network 416 such as the Internet. For example, the communication interface 413 may be a network interface card to attach to any packet switched LAN. As another example, the communication interface 413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 413 sends and receives electrical, electromagnetic or optical signals that carry digital data streams representing various types of information.

The network link 414 typically provides data communication through one or more networks to other data devices. For example, the network link 414 may provide a connection to another computer through a local network 415 (e.g., a LAN) or through equipment operated by a service provider, which provides communication services through a communications network 416. In preferred embodiments, the local network 414 and the communications network 416 preferably use electrical, electromagnetic, or optical signals that carry digital data streams. The signals through the various networks and the signals on the network link 414 and through the communication interface 413, which carry the digital data to and from the computer system 401, are exemplary forms of carrier waves transporting the information. The computer system 401 can transmit and receive data, including program code, through the network(s) 415 and 416, the network link 414 and the communication interface 413. Moreover, the network link 414 may provide a connection through a LAN 415 to a mobile device 417 such as a personal digital assistant (PDA), laptop computer, or cellular telephone. The LAN communications network 415 and the communications network 416 both use electrical, electromagnetic or optical signals that carry digital data streams. The signals through the various networks and the signals on the network link 414 and through the communication interface 413, which carry the digital data to and from the system 401, are exemplary forms of carrier waves transporting the information. The computer system 401 can transmit notifications and receive data, including program code, through the network(s), the network link 414 and the communication interface 413.

Obviously, numerous modifications and variations of the present invention are possible in light of the above teachings. It is therefore to be understood that within the scope of the appended claims, the invention may be practiced otherwise than as specifically described herein.

What is claimed is:

1. A system for providing consistent information in program specific information (PSI) tables and program and system information protocol (PSIP) tables of a digital television transport stream, comprising:
   a PSIP generator configured to receive program information and to generate PSIP information, wherein said PSIP generator is stored on a non-transitory computer-readable storage medium; and
   a reconciler mechanism configured to
      receive a first data element from a PSI table of an encoded stream and a second data element from the PSIP generator, the first data element and the second data element both corresponding to an information element,
      deconflict the first data element and the second data element based on a rule to produce a deconflicted data element, and
      update the information element of the PSI table and the information element of the PSIP table so both include the deconflicted data element in the digital television transport stream.

2. The system of claim 1, wherein the PSIP generator is further configured to receive the program information through a file interface.

3. The system of claim 2, wherein the file interface comprises an interface based on a markup language.

4. The system of claim 3, wherein the markup language comprises at least one of the eXtensible Markup Language (XML), the Hypertext Markup Language (HTML), the Dynamic HTML (DHTML), and the Handheld Device Markup Language (HDML).

5. The system of claim 1, wherein the PSIP generator is further configured to receive the program information from at least one of a listing service database and a proprietary database.

6. The system of claim 5, wherein the listing service database comprises a database provided by Tribune Media Services.

7. The system of claim 1, wherein the PSIP generator comprises: a PSIP editor configured to allow a user to manipulate PSIP information provided in the program information; and a PSIP scheduler configured to determine a time to broadcast a particular piece of PSIP information.

8. The system of claim 1, wherein the information element corresponds to at least one of a transport stream identifier, a PCR PID, an elementary stream PID, an elementary stream language indicator, a content advisory rating indicator, a close captioning indicator, and a virtual channel activity status indicator.

9. The system of claim 1, wherein the rule is at least one of configurable by a user and programmable.

10. The system of claim 1, wherein the digital television transport stream comprises an Advanced Television Systems Committee (ATSC) digital television (DTV) stream.

11. The system of claim 1, wherein the encoded stream comprises a Moving Pictures Expert Group (MPEG) standard stream.

12. A non-transitory computer-readable storage medium having an embedded computer program code for causing a computer to provide consistent information in program specific information (PSI) tables and program and system information protocol (PSIP) tables of a digital television transport stream, the embedded computer program code having a first computer code configured to receive program information and to generate PSIP information; and a second computer code configured to:
   (a) receive a first data element from a PSI table of an encoded stream and a second data element from the first computer code, the first data element and the second data element both corresponding to an information element, and
   (b) deconflict the first data element and the second data element based on a rule to produce a deconflicted data element to update the information element of the PSI table and the information element of the PSIP table so both include the deconflicted data element in the digital television transport stream.

13. The non-transitory computer-readable storage medium of claim 12, wherein the first computer code comprises: a third computer code configured to allow a user to manipulate PSIP information provided in the program information; and a fourth computer code configured to determine a time to broadcast a particular piece of PSIP information.

14. A method for providing consistent information in program specific information (PSI) tables and program and system information protocol (PSIP) tables of a digital television transport stream, comprising the steps of:

acquiring a first data element from a PSI table of an encoded;

acquiring a second data element from a PSIP table from a PSIP generator, wherein said PSIP generator is stored on a non-transitory computer-readable storage medium and the second data element of the PSIP table and the first data element of the PSI table both correspond to an information element;

deconflicting the first data element and the second data element based on a rule to produce a deconflicted data element; and updating the information element of the PSI table and the information element of the PSIP table so both include the deconflicted data element in the digital television transport stream.

15. A system for providing consistent information in program specific information (PSI) tables and program and system information protocol (PSIP) tables of a digital television transport stream, comprising:

means for acquiring a first data element from a PSI table of an encoded stream;

means for acquiring a second data element from a PSIP table from a PSIP generator, the second data element of the PSIP table and the first data element of the PSI table both corresponding to an information element, wherein said PSIP generator is stored on a non-transitory computer-readable storage medium;

means for deconflicting the first data element and the second data element based on a rule to produce a deconflicted data element; and means for updating the information element of the PSI table and the information element of the PSIP table so both include the deconflicted data element in the digital television transport stream.

16. A method for providing consistent information in program specific information (PSI) tables and program and system information protocol (PSIP) tables of a digital television transport stream, comprising the steps of:

acquiring a PSI table of an encoded stream;
acquiring a PSIP table from a PSIP generator;
applying a rule to deconflict the PSI table and the PSIP table to produce deconflicted information; and
updating both the PSI table and the PSIP table of the digital television transport stream so each contains the deconflicted information.

17. The method of claim 16, further comprising the steps of, prior to the applying step: reading re-mapping information from a configuration information source; and generating an updated PSI table based on the re-mapping information, wherein the applying step and the updating step use the updated PSI table.

18. The method of claim 16, wherein the applying a rule step comprises: checking for inconsistent information between the PSI table and the PSIP table; and replacing the inconsistent information in the PSIP table with corresponding information from the PSI table.

19. The method of claim 16, wherein the applying a rule step comprises: replacing all information of the PSIP table with corresponding information from the PSI table.

20. The method of claim 16, wherein the applying a rule step comprises: checking for inconsistent information between the PSI table and the PSIP table; and replacing the inconsistent information in the PSI table with corresponding information from the PSIP table.

21. The method of claim 16, further comprising the steps of: determining whether a PSI table update is needed; and acquiring a new PSI table from the encoded stream when it is determined that a PSI table update is needed.

22. The method of claim 16, further comprising the steps of: determining whether a PSIP table update is needed; and acquiring a PSIP table from the PSIP generator when it is determined that a PSIP table update is needed.

23. The method of claim 17, further comprising the steps of: determining whether a configuration update is needed; and acquiring new configuration information from the configuration information source when it is determined that a configuration update is needed.

24. A remultiplexer configured to providing consistent information in program specific information (PSI) tables and program and system information protocol (PSIP) tables of a digital television transport stream, comprising:

a PSIP generator stored on a non-transitory computer storage medium and configured to receive program information and to generate PSIP information; and a reconciler mechanism configured to receive a first data element from a PSI table of an encoded stream and a second data element from the PSIP generator, the first data element and the second data element both corresponding to an information element, deconflict the first data element and the second data element based on a rule to produce a deconflicted data element, and update the information element of the PSI table and the information element of the PSIP table so both include the deconflicted data element in the digital television transport stream.

* * * * *